US007275263B2

(12) United States Patent
Bajikar et al.

(10) Patent No.: US 7,275,263 B2
(45) Date of Patent: Sep. 25, 2007

(54) METHOD AND SYSTEM AND AUTHENTICATING A USER OF A COMPUTER SYSTEM THAT HAS A TRUSTED PLATFORM MODULE (TPM)

(75) Inventors: Sundeep M. Bajikar, Santa Clara, CA (US); Luke E. Girard, Santa Clara, CA (US); Kelan C. Silvester, Portland, OR (US); Francis X. McKeen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 10/639,060

(22) Filed: Aug. 11, 2003

(65) Prior Publication Data

US 2005/0039013 A1     Feb. 17, 2005

(51) Int. Cl.
*G06F 17/30*     (2006.01)
(52) U.S. Cl. ............................. 726/28; 726/4; 726/17
(58) Field of Classification Search .................. 726/28, 726/17, 4; 713/2, 185
See application file for complete search history.

(56) References Cited

U.S. PATENT DOCUMENTS 5,210,795 A *    5/1993   Lipner et al. ................ 713/185

OTHER PUBLICATIONS

Satem: Trusted Service Code Execution across Transactions Gang Xu; Borcea, C.; Iftode, L.; Reliable Distributed Systems, 2006. SRDS '06. 25th IEEE Symposium on Oct. 2006 pp. 321-336.*
Unified Architecture for Large-Scale Attested Metering Michael LeMay; George Gross; Carl A. Gunter; Sanjam Garg; System Sciences, 2007. HICSS 2007. 40th Annual Hawaii International Conference on Jan. 2007 pp. 115-115.*
Frameworks Built on the Trusted Platform Module Barrett, M.; Thomborson, C.; Computer Software and Applications Conference, 2006. COMPSAC '06. 30th Annual International vol. 2, Sep. 2006 pp. 59-62.*
https://www.trustedcomputinggroup.org/faq/TPMFAQ/, as accessed on Dec. 29, 2006.*
https://www.trustedcomputinggroup.org/faq/, as accessed on Dec. 29, 2006.*
https://www.trustedcomputinggroup.org/faq/TSSFAQ/, as accessed on Dec. 29, 2006.*
Mayfield, Charles, "Who Goes There?", Security Management, (Mar. 1, 1989), pp. 1-5.*

* cited by examiner

*Primary Examiner*—David Jung
(74) *Attorney, Agent, or Firm*—Blakely, Sokoloff, Taylor & Zafman LLP

(57) ABSTRACT

In one embodiment, the invention provides a method comprising storing user authentication information in a hardware structure of a computer system, the hardware structure including a security mechanism to protect the stored authentication information from unauthorized access, and authenticating a user of the computer system by comparing user input authentication information with the stored authentication information.

24 Claims, 4 Drawing Sheets

METHOD AND SYSTEM AND AUTHENTICATING A USER OF A COMPUTER SYSTEM THAT HAS A TRUSTED PLATFORM MODULE (TPM)

FIELD OF THE INVENTION

This invention relates to the security of computer systems. In particular, the invention relates to a method and system for authenticating a user of a computer system.

BACKGROUND

For security purposes, it is known to force a user of the computer system, such as a notebook computer, to provide user authentication information to the computer system during a login process and to allow the user access to the computer system only in the event of the authentication information provided by the user matching corresponding authentication information stored in the computer system.

While the above mentioned user authentication process is useful in preventing unauthorized access to a computer system, it suffers from the disadvantage that the corresponding authentication information is stored in a memory device, e.g., a hard disk of the computer system, and can be retrieved from the memory device by unauthorized persons.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
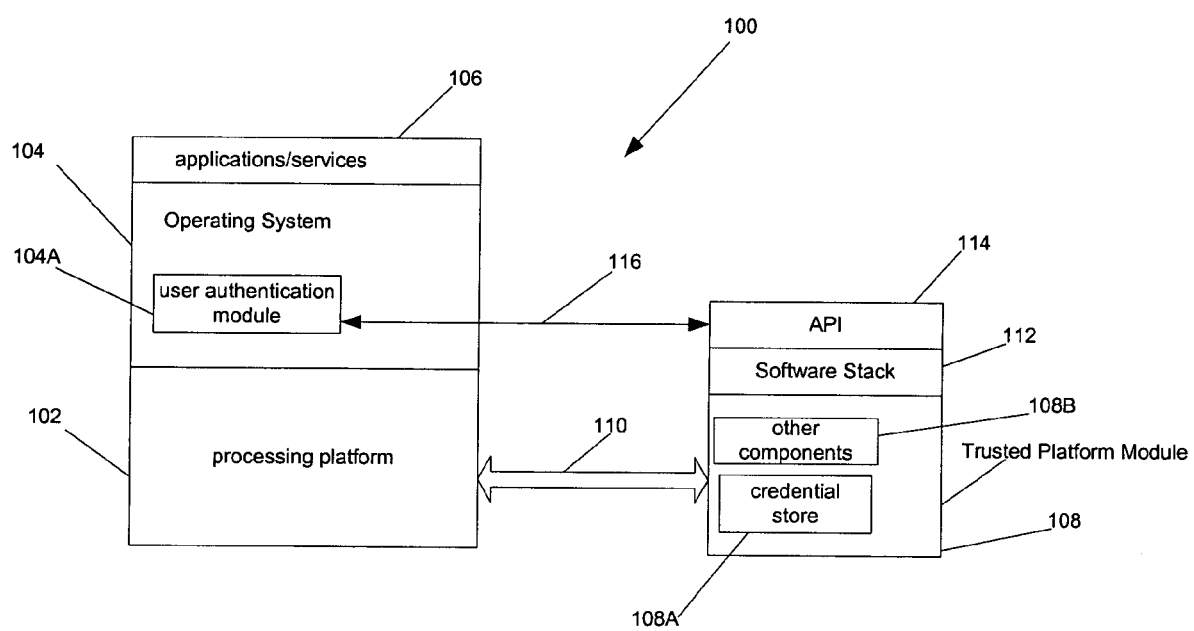
FIG. 1 shows a high-level block diagram of a system in accordance with one embodiment of the invention.

FIG. 1 of the drawings shows a high-level block diagram of a system 100, in accordance with one embodiment of the invention. The system 100 includes a processing platform 102 which, in accordance with one embodiment of the invention includes the components of the generic computer system, such as the system 400 shown in FIG. 4 of the drawings. The processing platform 102 is under control of an operating system 104 which defines an interface to the processing platform 102 for software applications and services 106.

The operating system 104 includes a user authentication module 104A that may be configured to force a user of the system 100 to undergo a user authentication or login process, wherein the user authenticates himself/herself to the system 100. If the user authentication is successful then access to the system 100 is allowed, otherwise access to the system 100 is denied.

In one embodiment, the user authentication module 104A displays a prompt to the user to prompt the user to enter user authentication information, such as a password. Once the user enters the user authentication information, the user authentication module 104A verifies that the user authentication information is correct by checking it against stored user authentication information. In one embodiment, unlike conventional systems, which store user authentication information, e.g., on a hard disk that can be accessed by third parties, the stored user authentication information which is used to verify the user input user authentication information is stored within a hardware unit that restricts access to the stored user authentication information and thus stores the user identification information in a secure fashion.

In one embodiment, the hardware unit 108 that stores the user authentication information takes the form of a Trusted Platform Module (TPM) as defined in the TPM specification of the Trusted Computer Platform Alliance (TCPA). In FIG. 1, the TPM is indicated by reference numeral 108. The TPM is connected to the processing platform 102 via a low pin count bus 110. As will be seen, the TPM 108 includes a credential store 108A which stores password and credential information relating to the system 100. The TPM 108 has a locked state in which information stored in the credential store 108A is inaccessible or protected, and an unlocked state in which the information is accessible.

In one embodiment, the user authentication module 104A supports multiple factor user authentication which includes, for example, a biometric factor, a token factor, and a password factor. The biometric factor may include a fingerprint, an iris scan, or a skin scan. The token may include a token device carried on the person of the user, which could for example, be a smartcard, a Bluetooth badge, or a mobile phone with a subscriber identity module (SIM). In one embodiment, the token may interface with the system 100 via a universal serial bus (USB) (not shown) that forms part of the processing platform 102.

In one embodiment, software comprising the user authentication module 104A executes in a protected mode of the system 400, wherein the software cannot be corrupted by malicious programs such as computer viruses. For this embodiment, the system 400 may have an architecture such as the Intel Le Grand architecture which is under control of a suitable operating system.

In accordance with embodiments of the invention, the credential store 108A stores user authentication information that is necessary to validate or verify the various factors of user authentication supported by the user authentication module 104A. Thus, for example, the credential store 108A may store a biometric signature or credential of the user, a password to gain access to the system 100, and a credential or signature relating to a token that is used to gain access to the system 100. The TPM 108 also includes other components 108B that are required to implement the functionality of the TPM 108 as specified by the TPM specification of the TCPA. For example, the other components may include an RSA key generator, a signature generator, a signature checker, a cryptographic hashing mechanism, a random number generator, etc. As will be seen, the system 100 also includes a software stack 112 to enable communications with the TPM 108. In one embodiment, the software stack 112 is a software stack defined by the TCPA and known as TSS.

The system 100 also includes an operating system application program interface (API) 114 that enables the operating system 104 to interface with the software stack 112. In one embodiment, the API 114 is a cryptographic API, for example, the Microsoft Cryptographic API (MS-CAPI) that provides services that enable application developers to add cryptography to applications Thus, applications can use the functions provided by interface 114 and the software stack 112 without knowing anything about the underlying implementation of security hardware. Application developers may also directly utilize the software TSS 112.

In one embodiment, communications between the operating system 104 and the API 114 are enabled by a software bridge or interface 116. In one embodiment, in order to ensure that communications between the user authentication module 104A and the API 114 over the software interface 116 are secure, the user authentication module 104A and the API 114 make use of key pairs to encrypt communications therebetween. The key pairs are stored in the credential store 108A of the TPM and is known to applications/services 106 that wish to communicate with the TPM 108.

Figure 2:
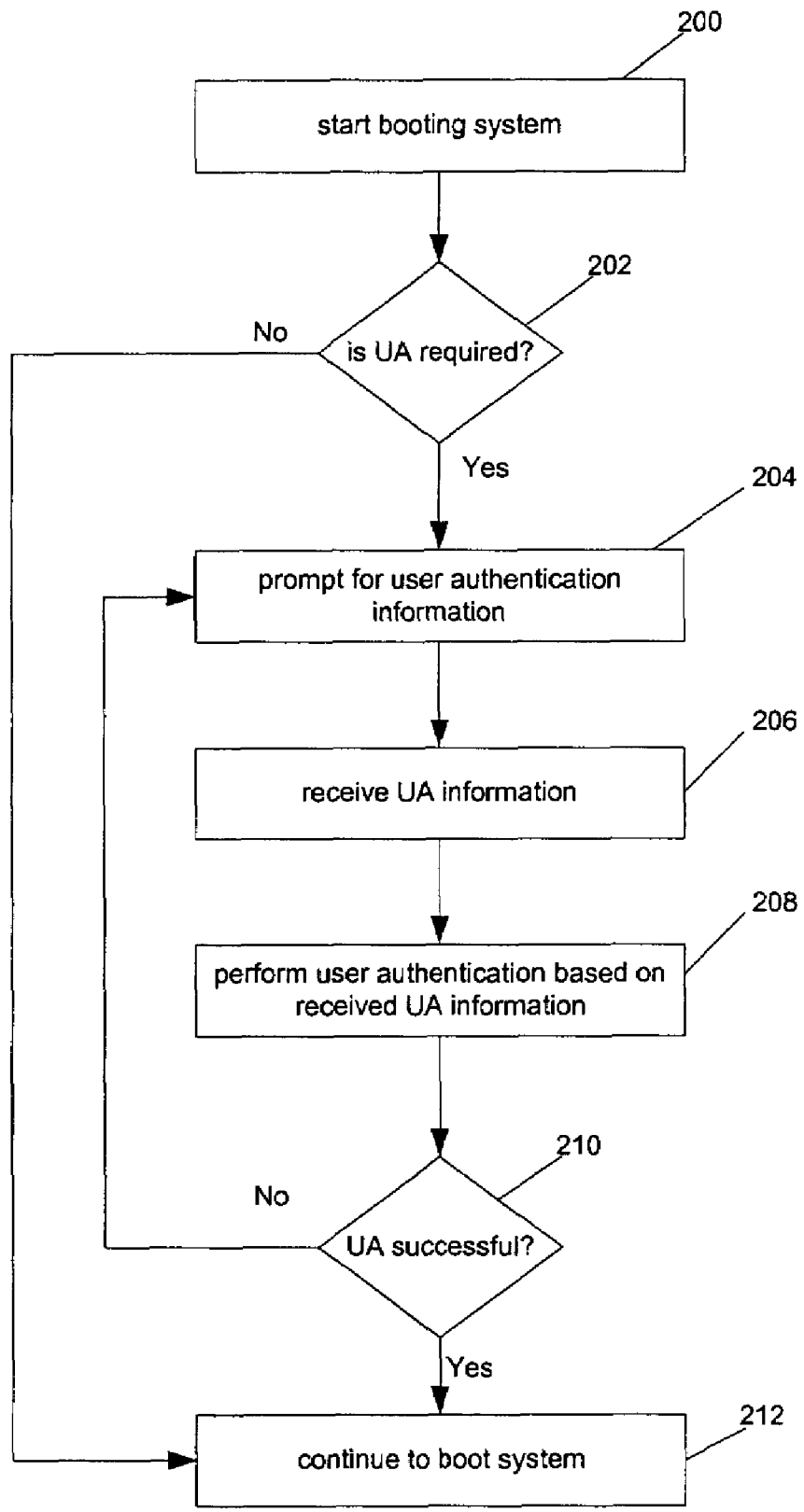
FIG. 2 illustrates a user authentication method performed by the system of FIG. 1 in accordance with one embodiment of the invention.

FIG. 2 of the drawings illustrates a user authentication method performed by the system 100 of the FIG. 1, in accordance with one embodiment of the invention. Referring to FIG. 2, at block 200, the system 100 starts a boot sequence. This sequence may be the initial power on sequence when the user first turns the system 100 on or it may be the sequence of events that occurs when control is passed from the hardware/firmware of the system 100 to the operating system (e.g., Microsoft Windows®) for the system 100. At block 202, the system 100 checks if user authentication is required. If no user authentication is required, then the system 100 continues to boot at block 212. If user authentication is required, then at block 204, the system 100 prompts the user for user authentication information. For example, at block 204, the user authentication module 104A may display a login prompt to the user, wherein the user is requested to supply, for example, a password to gain access to the system 100. If the system 100 is configured to perform multiple factor user authentication, then at 204, the user authentication module 104A will prompt the user to supply appropriate user authentication information corresponding to each of the multiple factors. Thus, in one embodiment, the user may be prompted to supply a password, a biometric factor, such as a fingerprint, a token factor, for example, a smartcard which is inserted into a USB port of system 100. In some cases, the system 100 may include sensors to sense the presence of the token. For example, the system 100 may include a proximity sensor to sense the proximity of a token carried by the user.

At block 206, the system 100 receives the user authentication information. Thereafter, at block 208, the system performs a user authentication process based on the received user authentication information. Details of the user authentication process performed at block 208 in accordance with one embodiment of the invention is shown in FIG. 3 of the drawings.

Figure 3:
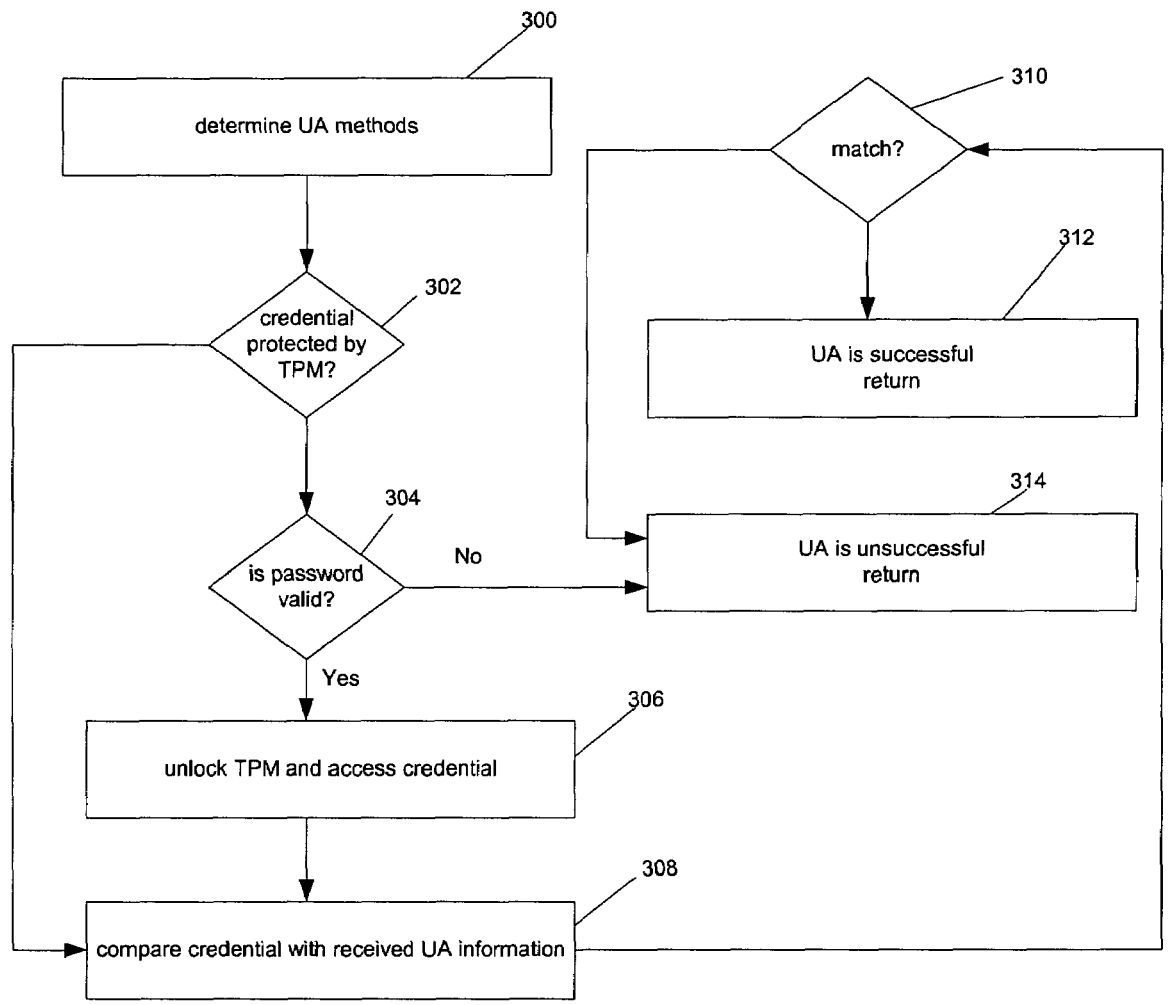
FIG. 3 illustrates operations performed during the user authentication method of FIG. 2, in greater detail.

Referring to FIG. 3, at block 300, the system 100 determines what user authentication methods, the system has been configured to use. For example, at block 300, the system 100 will determine what user authentication factors the system 100 has been configured to require before access to the system may be gained. Thus, at block 300, the system 100 determines if there is a password, a biometric signature, or a token, etc. is required in order to gain access to the system.

At block 302, the system 100 determines whether stored user authentication information required to verify the received user authentication information is protected or stored by the TPM 108. In one embodiment, the stored user authentication information takes the form of credentials or certificates that are stored in the credential store 108A of the TPM 108. If at 302, it is determined that the credentials are not stored by the TPM 108, then control passes to block 308. However, if it determined that the credentials are stored by the TPM 108, then block 304 executes, wherein the system 100 determines if a password received at block 206 (see FIG. 2), is valid. The password is valid if it matches a corresponding password stored in the credential store 108A. If the password is invalid, then control passes to block 314, otherwise block 306 executes. At block 306, the TPM 108 unlocks and the user authentication module 104A accesses the credentials stored in the credential store 108A. As noted earlier, these credentials may include credentials that are required to validate or verify other authentication factors required by the system 100 in addition to a password. In another embodiment instead of using a password to unlock the TPM, some other authentication factor, e.g., a token may be used. In this embodiment, the token, e.g., a smartcard may send encrypted authentication information to the TPM, which verifies the information and unlocks itself to make the stored authentication information within the TPM accessible to the user authentication module 104A. Thereafter, at block 308, the user authentication module 104A compares the credentials from the credential store 108A with those received as part of the user authentication information. In one embodiment, this comparison may be performed by the TPM using authentication information from the user authentication module 104A. At block 310, the system determines if the credentials from the credential store 108A match those received from the user. If there is no match, then control passes to block 314, otherwise, block 312 executes. At block 312, the system sets an indicator, for example, a variable, to indicate that user authentication was successful. At block 314, the system sets the indicator to indicate that user authentication was unsuccessful.

Referring now to FIG. 2 of the drawings, at block 210, if user authentication was unsuccessful, then control passes to block 204, wherein the user is again prompted to supply user authentication information. If, however, at block 210, the user authentication was successful, then control passes to block 212 wherein the system continues to boot, and user is allowed to gain access to the system.

Figure 4:
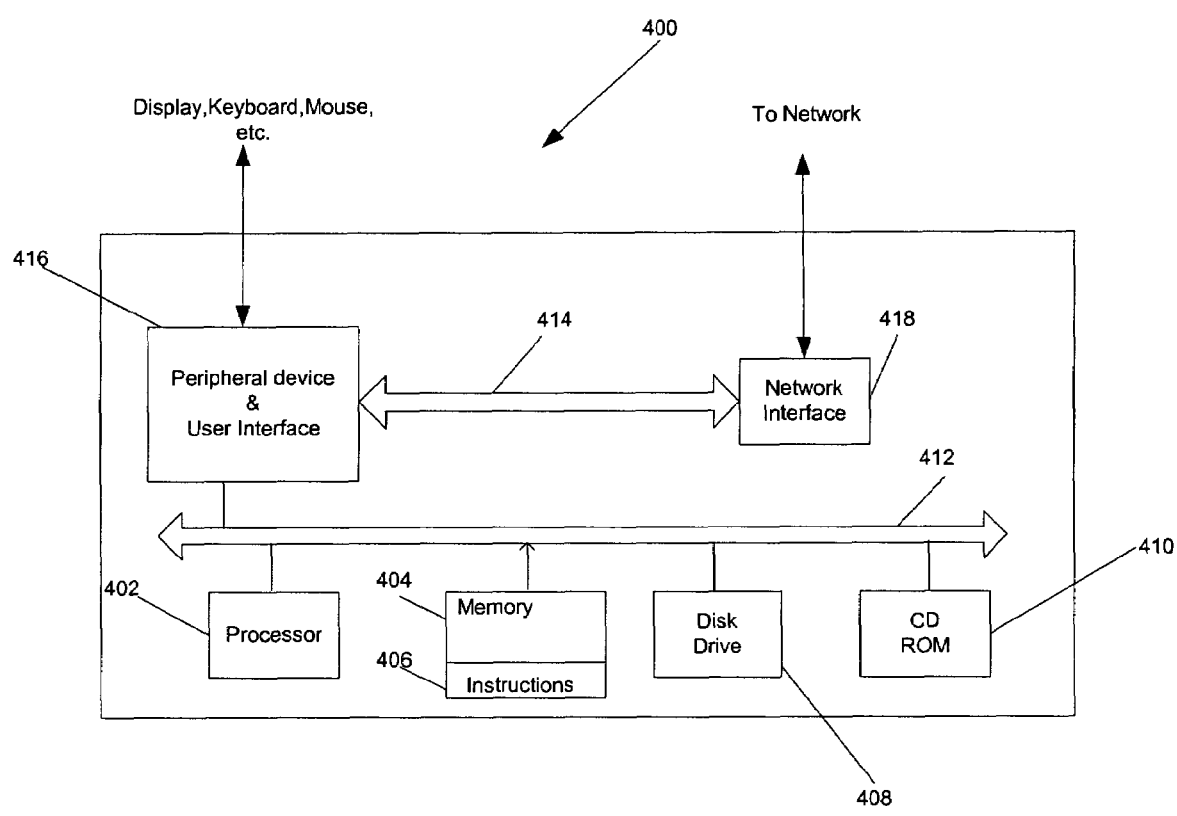
FIG. 4 shows the components of a processing platform forming part of the system of FIG. 1, in accordance with one embodiment of the invention.

Referring now to FIG. 4 of the drawings, reference numeral 400 generally indicates an example of hardware that may be used to implement the processing platform 102 in accordance with one embodiment of the invention. The hardware 400 includes a memory 404, which may represent one or more physical memory devices, which may include any type of random access memory (RAM), read only memory (ROM) which may be programmable, flash memory, non-volatile mass storage device, or a combination of such memory devices. The memory 404 is connected via a system bus 412 to a processor 402. The memory 404 includes instructions 406 which when executed by the processor 402 cause the processor to perform the methodology of the invention as discussed above. Additionally, the hardware 400 includes a disk drive 408 and a CD ROM drive 410 each of which is coupled to a peripheral-device and user-interface 416 via, the bus 412. The processor 402, the memory 404, the disk drive 408 and the CD ROM 410 are generally known in the art. The peripheral-device and user-interface 416 provides an interface between the system bus 412 and components connected to a peripheral bus 414 as well as to user interface components, such as a display, mouse and other user interface devices. The processor 402 can be or include any one or more of general or special purpose programmable microprocessor, application specific integrated circuit (ASIC), programmable logic device (PLD), etc. A network interface 418 is coupled to peripheral bus 414 and provides network connectivity to the hardware 400.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
storing multiple authentication factor user authentication information in a hardware structure of a computer system, the hardware structure including a security mechanism to protect the stored authentication information from unauthorized access;
authenticating, by a trusted user authentication module of the computer system, a user of the computer system by comparing user input authentication information with the stored multiple authentication factor authentication information; and
unlocking the security mechanism of the hardware structure if at least two of the user input authentication information each match a corresponding multiple authentication factor user authentication information stored in the hardware structure.

2. The method of claim 1, wherein the hardware structure comprises a Trusted Platform Module (TPM).

3. A method, comprising:
storing multiple authentication factor user authentication information in a Trusted Platform Module (TPM) of a computer system;
authenticating a user of the computer system based on a security mechanism of the hardware structure and the stored multiple authentication factor user authentication information; and
unlocking the TPM if at least two of the user input authentication information each match a corresponding multiple authentication factor user authentication information stored in the TPM.

4. The method of claim 3, wherein the multiple authentication factors are selected from the group consisting of a password, a biometric factor, and a token factor.

5. The method of claim 3, further comprising defining an interface between a user authentication module and the TPM to communicate the user authentication information to the TPM.

6. The method of claim 5, wherein the interface comprises a combination of the Microsoft Cryptographic Application Program Interface (MS-CAPI) and functions provided by the Trusted Computing Platform Alliance (TOPA) software stack (TSS).

7. The method of claim 3, wherein the comparing is performed by the TPM.

8. The method of claim 3, wherein the comparing is performed by the user authentication module using the user authentication information from the TPM.

9. A method, comprising:
initiating a boot sequence in a computer system;
stopping the boot sequence to receive user authentication information;
communicating the user authentication information to a hardware unit that includes stored multiple authentication factor user authentication information, the hardware unit having a locked state in which the stored multiple authentication factor user authentication information is inaccessible, and an unlocked stated in which the stored user authentication information is accessible;
executing, by a trusted user authentication module, an authentication operation to authenticate a user of the computer system, wherein the user is authenticated if the received user authentication information matches at least two of the stored multiple authentication factor user authentication information; and
resuming the boot sequence if the user is authenticated.

10. The method of claim 9, wherein the hardware unit comprises a (TPM).

11. The method of claim 10, wherein communicating the user authentication information comprises communicating the user authentication information via a bridge defined between a user authentication module and an Application Program Interface (API) that interfaces with the TPM.

12. The method of claim 11, wherein the API is a combination of the Microsoft Cryptographic Application Program Interface (MS-CAPI) and functions provided by the Trusted Computing Platform (TCPA) software stack (TSS).

13. The method of claim 9, wherein the received user authentication information is selected from the group consisting of a password, biometric information, and information from a token.

14. The method of claim 13, wherein performing the authentication operation comprises determining if the password matches a corresponding password stored in the TPM and transitioning the TPM to the unlocked state if there is a match.

15. The method of claim 14, wherein performing the authentication operation comprises retrieving stored credentials from the TPM and authenticating the user if the stored credentials match the biometric information and the information from the token.

16. A system, comprising:
a processing platform that includes a trusted user authentication module; and
a hardware unit coupled to the processing platform, the hardware unit being capable of storing multiple authentication factor user authentication information in a secure manner, wherein the trusted user authentication module in cooperation with the hardware unit authenticates a user by comparing user input authentication information received via the user authentication module with the stored multiple authentication factor user authentication information in the hardware unit and unlocking the hardware unit if at least two of the user input authentication information match a corresponding multiple authentication factor user authentication information stored in the TPM.

17. The system of claim 16, further comprising an interface defined between the user authentication module and the hardware unit to communicate user authentication information therebetween.

18. The system of claim 17, wherein the interface comprises a software interface.

19. The system of claim 18, wherein the interface comprises a combination of the Microsoft Cryptographic Application Program Interface (MS-CAPI) and functions provided by the Trusted Computing Platform Alliance (TCPA) software stack (TSS).

20. The system of claim 19, wherein the multiple factor authentication comprises a biometric factor, and a token factor, in addition to a password factor.

21. The system of claim 16, wherein the hardware unit comprises a Trusted Platform Module (TPM).

22. A system, comprising:
a processing platform; and
a (TPM) coupled to the processing platform, wherein the processing platform comprises a trusted user authentication module which in cooperation with the TPM performs a multiple factor authentication of a user based on multiple authentication factor user authentication information stored in a secure manner in the TPM and user input authentication information, and unlocks the TPM if at least two of the user input authentication information match a corresponding multiple authentication factor user authentication information stored in the TPM.

23. The system of claim 22, further comprising an interface defined between the user authentication module and the TPM that allows the user authentication module to communicate a password received from the user to the TPM to unlock the TPM.

24. The system of claim 23, wherein the interface comprises a software interface that includes the Microsoft Cryptographic Application Program Interface (MS-CAPI) and functions provided by the Trusted Computing Platform Alliance (TCPA) software stack (TSS).

* * * * *

UNITED STATES PATENT AND TRADEMARK OFFICE
CERTIFICATE OF CORRECTION

PATENT NO. : 7,275,263 B2 Page 1 of 1
APPLICATION NO. : 10/639060
DATED : September 25, 2007
INVENTOR(S) : Bajikar et al.

It is certified that error appears in the above-identified patent and that said Letters Patent is hereby corrected as shown below:

On the Title Page, Item (54) in the title at line 1, delete the second occurrence of "AND" and insert --FOR--.

In column 6, at line 8, delete "(TOPA)" and insert --(TCPA)--.

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,275,263 B2 | Page 1 of 1 |
| APPLICATION NO. | : 10/639060 | |
| DATED | : September 25, 2007 | |
| INVENTOR(S) | : Bajikar et al. | |

It is certified that error appears in the above-identified patent and that said Letters Patent is hereby corrected as shown below:

On the Title Page, Item (54) in the title at line 1, and Column 1, line 1, delete the second occurrence of "AND" and insert --FOR--.

In column 6, at line 8, delete "(TOPA)" and insert --(TCPA)--.

This certificate supersedes the Certificate of Correction issued May 27, 2008.

Signed and Sealed this

Twenty-fourth Day of June, 2008

JON W. DUDAS
*Director of the United States Patent and Trademark Office*